3,823,134
DICHLORO-α,α,α-TRIFLUOROTOLUAMIDES
William J. Houlihan, Mountain Lakes, N.J., assignor to Sandoz-Wander, Inc., Hanover, N.J.
No Drawing. Continuation-in-part of application Ser. No. 864,869, Oct. 8, 1969, which is a continuation-in-part of application Ser. No. 835,252, June 20, 1969, both now abandoned. This application Dec. 18, 1972, Ser. No. 316,103
Int. Cl. C07c 103/20
U.S. Cl. 260—239 BA     7 Claims

ABSTRACT OF THE DISCLOSURE

Dichloro-α,α,α-trifluorotoluamides are prepared by reacting the corresponding acid chloride with the desired amine in an appropriate solvent. The resulting compounds are particularly useful as anticoccidial agents and central nervous system depressants.

---

This application is a continuation-in-part of U.S. Patent Application Ser. No. 864,869 filed Oct. 8, 1969, now abandoned, which in turn is a continuation-in-part of U.S. Patent Application Ser. No. 835,252 filed June 20, 1969, now abandoned.

This application relates to novel derivatives of dichloro-α,α,α-trifluoro toluic acids, their preparation, and their use as herbicides, central nervous system depressants and anticoccidial agents. In particular, it relates to the amino and substituted amino derivatives thereof and in certain instances their acid addition salts.

The compounds of this invention may be represented by the formla:

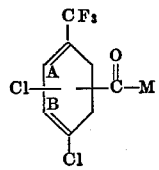

(I)

where
Cl is restricted to either the "A" or "B" position; and when Cl is at "A",

is at "B," and
M is an amino radical selected from the group consisting of
(i)

where the substituent groups $R^1$ and $R^2$ can be the same or different and are selected from the group comprising hydrogen; straight or branched chain lower alkyl radicals containing 1 to 4 carbon atoms, e.g., methyl, ethyl, etc.; alicyclic radicals containing 5, 6 or 7 ring carbons; straight and branched chain alkenyl or alkynyl radicals concontaining 3 or 4 carbon atoms, e.g., allyl, propargyl or methallyl radicals; and phenyl, tolyl and benzyl radicals;
(ii) heterocyclic radicals having the structure:

wherein X is O, S, or N-$R^3$, and $R^3$ is hydrogen, a lower alkyl radical containing 1 to 4 carbon atoms, a phenyl radical or

where $R^4$ is lower alkyl containing 1 to 3 carbon atoms;
(iii) diamino radicals and substituted diamino radicals of the formula:

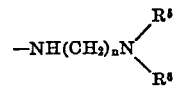

where n is 0, 2, 3, or 4; $R^5$ and $R^6$ are hydrogen, lower alkyl radical containing 1 to 4 carbon atoms or phenyl radical;
(iv) hydroxylamino;
(v) ureido; and
(vi) 3-azabicyclo[2.2.1]nonyl.

Examples of some of the preferred amino structures are as follows:

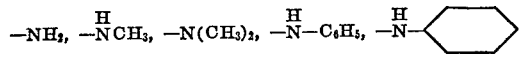
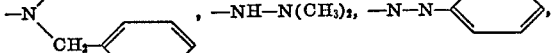
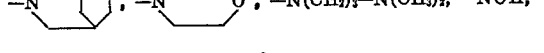
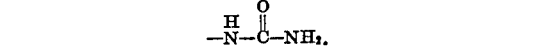
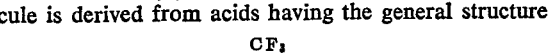

The dichloro-α,α,α-trifluoro-toluoyl portion of the molecule is derived from acids having the general structure:

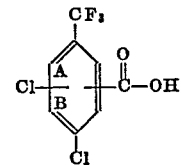

(II)

where

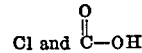

have the restriction indicated above for Cl and

and include the following:
2,6-dichloro-α,α,α-trifluoro-m-toluic acid,

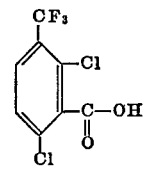

(IIa)

5,6-dichloro-α,α,α-trifluoro-m-toluic acid,

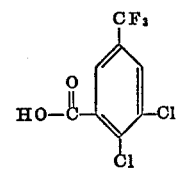

(IIb)

5,6-dichloro-α,α,α-trifluoro-o-toluic acid,

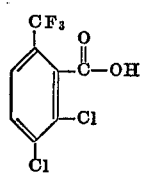

(IIc)

and 4,5-dichloro-α,α,α-trifluoro-o-toluic acid,

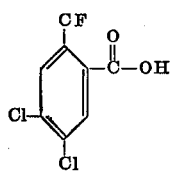

(IId)

The last three acids are synthesized conveniently as a mixture, and the mixture may be used in the process of this invention.

The process for preparing the compounds of this invention is illustrated generally in the following flow diagram:

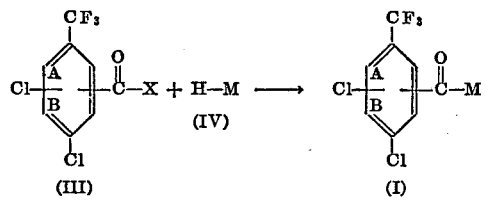

where
X is a halogen having an atomic weight of about 35 to 80,
M is as defined above, and
Cl is, as previously indicated, restricted to "A" or "B;" and when Cl is at "A," the

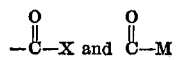

are at "B."

The product I is prepared by treating the acid halide III with an aqueous or an inert solvent solution containing the amine IV. It is preferred that the reaction be allowed to continue for about 2 to 48 hours at temperatures between approximately 15° C. and 75° C.

The preferred acid halide is the acid chloride and the preferred inert solvents are chloroform, ethylene dichloride, benzene, or hexane.

The preferred amines used in the process are ammonia, methylamine, dimethylamine, aniline, cyclohexylamine, N,N-dimethyl hydrazine, phenylhydrazine, N,N,-dimethylamino propylamine, N-propargylbenzylamine, morpholine and 3-azabicyclo[2.2.1]nonane.

The final product I is isolated using conventional techniques such as by concentrating the reaction mixture of "step 2" under vacuum, and filtering off the crude product. The product can be employed in the crude form, or it can be further purified by recrystallizing from 1:1 alcohol-water mixture and thereafter filtering and drying under vacuum.

The product can also be isolated in salt form where tautomerism or the presence of an amine group permits. For example, in group i) above where $R^1$ or $R^2$ is a hydrogen, tautomerism in many cases permits salt formation. On the other hand, group ii), where X is N—$R^3$ and $R^3$ is hydrogen, lower alkyl or phenyl, and group iii) readily form salts because of the presence of a second amine group. Representative of such salts are the mineral acid salts, such as the hydrochloride, hydrobromide, sulfate, phosphate, and the like and the organic acid salts, such as the acetate, succinate, benzoate, p-toluenesulfonate, benzenesulfonate and the like.

This invention also encompasses the acid halide III which is prepared by treating the acid II in excess reagent or inert solvent, such as chloroform, ethylene dichloride, benzene, toluene, hexane or heptane with a halogenating agent, e.g. $SOCl_2$, $PCl_3$, $PCl_5$, and $SOBr_2$. The reaction is illustrated in the following scheme using thionyl chloride, the preferred halogenation agent:

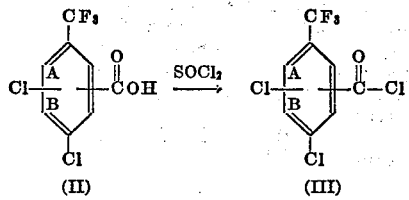

It is preferred that the reaction be continued for approximately 1 to 24 hours at a temperature between about 30° C. and 125° C., and preferably at the reflux temperature of the system.

The acids II are prepared by treating in an inert solvent the corresponding lithium intermediate compound of formula V with carbon dioxide:

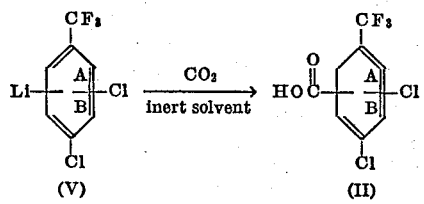

where Cl and Li have the aforementioned restrictions for Cl and

The reaction may be conveniently carried out at a temperature of from about —50° C. to about —10° C. and preferably at a temperature of —25° C. to —10° C. The carbon dioxide used can be a solid or gas. The solvent may be lower hydrocarbons such as pentane, hexane, heptane and the like, ethers such as diethyl ether, dibutyl ether and the like, tetrahydrofuran and benzene.

The process for preparing compound V may be represented by the following reaction:

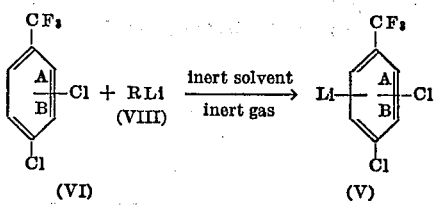

wherein Cl and Li have the above-stated restriction, and R is straight chain lower alkyl having 1 to 6 carbon atoms.

The intermediate lithium compound V may be prepared by reacting a dichloro-trifluorotoluene VI with a straight chain lower alkyl lithium compound VII having 1 to 6 carbon atoms in a solvent in the presence of an inert gas. The preferred alkyl lithium compound is butyl lithium. The solvent may be lower hydrocarbons such as pentane, hexane, heptane, and the like, ethers such as diethyl ether, dibutyl ether, and the like, tetrahydrofuran and benzene. The inert gas may be nitrogen, helium, argon, and the like. The reaction conveniently takes place at temperatures of about —60° C. to —30° C. with the preferred temperature range being —50° C. to —40° C.

When the starting material of formula VI is 2,4-dichloro-α,α,α-trifluorotoluene,

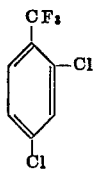
(VIII)

the lithium intermediate has the structural formula:

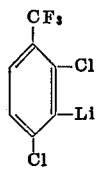
(IX)

When the starting material of formula VI is 3,4-dichloro-α,α,α-trifluorotoluene,

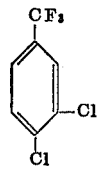
(X)

a mixture is obtained as represented by the structural formula:

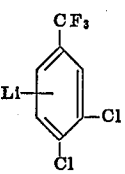
(XI)

Using the two preceding reactions described above, the acids IIa, IIb, IIc, and IId can be prepared. When 2,4-dichloro-α,α,α-trifluorotoluene VIII is the starting material, the 2,6-dichloro-α,α,α-trifluoro-m-toluic acid IIa is obtained. Starting with 3,4-dichloro-α,α,α-trifluorotoluene X a mixture of the 5,6-dichloro-α,α,α-trifluoro-m-toluic acid IIb, 5,6-dichloro-α,α,α-trifluoro-o-toluic acid IIc and 4,5-dichloro-α,α,α-trifluoro-o-toluic acid IId is obtained with the 5,6-dichloro-α,α,α-trifluoro-m-toluic acid IIb predominating. Conventional recovery techniques are utilized for obtaining the acids IIa, IIb, IIc and IId.

The compounds of formula VI are known and are prepared by methods disclosed in the literature.

The compounds of this invention can be used as herbicides at dosage levels normally employed for this purpose that is, between 2 to 30 lbs. per acre. The preferred range is 2 to 10 lbs. per acre. For this use, the base form of the compound normally is employed.

The instant compounds are also useful in the control of poultry coccidiosis. For this purpose, the base form can be administered in the feedstuff of the birds; or the salt form, if structurally possible, can be given in the drinking water. If desired, the compounds can be given by direct administration dissolved or suspended in a suitable solvent. In any event, only minor amounts are needed to obtain the desired anticoccidial effect. For optimum results, it is preferred that the base compounds be administered in the feed of the poultry, which is given ad libitum to the birds. Feed concentrations of from 0.005% to 0.3% preferably from 0.01% to 0.1% especially from 0.03% to 0.06% are recommended.

The compounds of formula (I) and the non-toxic acid addition salts which can be formed by some of these compounds as discussed above are also useful because they possess pharmacological activity in animals. In particular, these compounds are useful as central nervous system depressants, especially as sedative hypnotics and minor tranquillizers as indicated (1) by their ability to produce docility in behavior tests in mice tested according to the 30-word adjective check sheet system basically as described by Irwin, S. (Gordon Research Conference Medicinal Chemistry 1959) and Chem (Symposium on Sedative and Hypnotic Drugs, Williams and Wilkins, 1954); (2) by the antagonism of tonic convulsion or death in mice in which convulsive seizures are chemically induced with N-sulfamoylazepine; (3) by the hexobarbital reinduction method of Winter (J. Pharmacol & Exp. Therap., *97*: 7, 1948) and (4) by their ability to facilitate the monosynaptic spike obtained by the dorsal-ventral root spinal preparation in male cats.

The compounds of formula (I) or the pharmaceutically acceptable acid addition salts which may be formed in certain instances discussed above may be combined with one or more pharmaceutically acceptable carriers or adjuvants, and may be administered orally in such forms as tablets, capsules, elixirs, suspensions and the like, parenterally in the form of an injectable solution or suspension or in special forms such as suppositories and the like. Depending upon the compound employed and the mode of administration and exact dosage utilized may vary.

In general, satisfactory results are obtained when these compounds are administered as sedative/hypnotics in the treatment of insomnia/tension at a daily dosage of about 0.4 milligrams to about 150 milligrams per kilogram of animal body weight. This daily dosage is preferably administered 2 to 4 times a day, or in sustained release form. For most large mammals, such as primates, the therapeutically effective total daily dosage is from about 30 milligrams to about 1000 milligrams. Dosage forms suitable for internal use comprise from about 7.5 milligrams to about 500 milligrams of the active compound in intimate admixture with a solid or liquid pharmaceutically acceptable carrier or diluent.

A representative formulation suitable for oral administration 2 to 4 times a day in fertility control is a capsule prepared by standard encapsulating techniques which contain the following:

| Ingredients | Weight (mg.) |
| --- | --- |
| 2,6-dichloro-α,α,α-trifluoro-m-toluamide | 25 |
| Inert solid diluent (starch, lactose, kaolin) | 275 |

EXAMPLE 1

2,6-dichloro-α,α,α-trifluoro-m-toluic acid

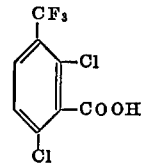

170 g. (0.79 mole) of 2,4-dichloro-α,α,α-trifluorotoluene and 1000 ml. of absolute tetrahydrofuran were charged to a flask equipped with stirrer, dropping funnel, carbon dioxide condenser and gas inlet tube. The system was flushed with dry nitrogen and cooled (carbon dioxide-acetone bath) to an internal temperature of −50° C. A 660 ml. solution of 15% n-butyllithium (1.06 mole n-butyllithium) in hexane was added dropwise (20 minutes) to the flask. The resulting dark red-purple solution was maintained at −50° C. for about one hour, and then poured onto a slurry of 750 g. powdered carbon dioxide and 250 ml. diethyl ether. After standing for about 20 hours at room temperature, the residue was treated with 750 ml. of 2N sodium hydroxide. The caustic layer was washed with toluene, acidified with concentrated HCl, extracted twice with 200 ml. of methylene chloride and dried with sodium sulfate. The methylene chloride layer was filtered and the solvent removed *in vacuo*. The residue was crystallized from heptane to give 2,6-dichloro-α,α,α-trifluoro-m-toluic acid; m.p. 90°–92° C.

EXAMPLE 2

5,6-dichloro-α,α,α-trifluoro-m-toluic acid

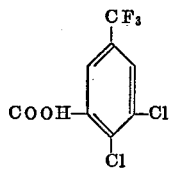

5,6-dichloro-α,α,α-trifluoro-o-toluic acid

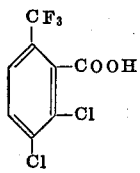

4,5-dichloro-α,α,α-trifluoro-o-toluic acid

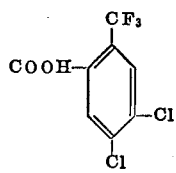

56.5 g. (0.263 mole) of 3,4-dichloro-α,α,α-trifluorotoluene and 500 ml. of absolute tetrahydrofuran were charged to a flask equipped with stirrer, dropping funnel, carbon dioxide, condenser and gas inlet tube. The system was flushed with dry nitrogen and cooled (carbon dioxide-acetone bath) to an internal temperature of −50° C. A 220 ml. solution of 15% n-butyllithium (0.352 mole) in hexane was added dropwise (20 minutes to the flask). The resulting dark red-purple solution was maintained at −50° C. for about one hour, and then poured onto a slurry of 350 g. powdered carbon dioxide and 150 g. diethyl ether. After standing for about 20 hours at room temperature the residue was treated with 300 ml. of 2N sodium hydroxide. The caustic layer was washed with toluene, acidified with concentrated HCl, extracted twice with 200 ml. of methylene chloride and dried with sodium sulfate. The methylene chloride layer was filtered and the solvent removed *in vacuo*. The residue was crystallized from heptane to give mainly a mixture of 5,6-dichloro-α,α,α-trifluoro-m-toluic acid, 5,6-dichloro-α,α,α-trifluoro-o-toluic acid and 4,5-dichloro-α,α,α-trifluoro-o-toluic acid.

EXAMPLE 3

2,6-dichloro-α,α,α-trifluoro-m-toluoyl chloride

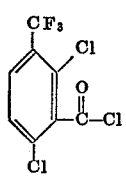

A mixture of 140 g. (0.59 mole) of 2,6-dichloro-α,α,α-trifluoro-m-toluic acid and 500 ml. of thionyl chloride was stirred and refluxed for 1.5 hours. The excess thionyl chloride was removed with a water pump and the residue distilled *in vacuo* to give 2,6-dichloro-α,α,α-trifluoro-m-toluoyl-chloride, b.p. 109°–112° at 18 mm.; $n_D^{20}$ 1.5038.

EXAMPLE 4

2,6-dichloro-α,α,α-trifluoro-m-toluamide

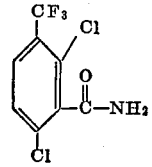

A solution containing 5.52 g. (0.04 mole) of potassium carbonate, 15 g. (0.12 mole) of 30% ammonium hydroxide, and 150 ml. of distilled water was treated with 11.1 g. (0.04 mole) of the above acid chloride and stirred at room temperature for 16 hours. The solid product was filtered off and crystallized from a 1:1 mixture of methanol and water to give 2,6-dichloro-α,α,α-trifluoro-m-toluamide; m.p. 118°–121° C.

EXAMPLE 5

N,N-dimethyl-2,6-dichloro-α,α,α-trifluoro-m-toluamide

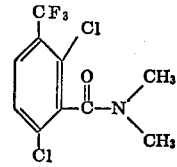

A mixture of 13.5 g. (0.12 moles) of 40% dimethylamine in water, 5.52 g. (0.04 mole) of potassium carbonate, and 150 ml. of distilled water was titrated with 11.1 g. (0.04) of the acid chloride of Example 3 and stirred at room temperature for 16 hours. The resultant product was filtered off and crystallized from a 1:1 mixture of methanol and water. The product obtained was N,N-dimethyl-2,6-dichloro - α,α,α - trifluoro-m-toluamide; m.p. 74°–77° C.

EXAMPLE 6

2,6-dichloro-α,α,α-trifluoro-m-toluanilide

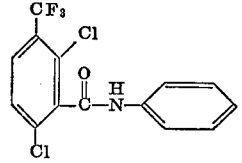

A solution of 11.1 g. of the acid chloride of Example 3 in 100 ml. of toluene was added to a solution of 9.3 g. (0.10 mole) of aniline in 150 ml. of toluene and stirred for 15 hours at room temperature. The reaction mixture was concentrated *in vacuo* and the residue recrystallized from 1:1 methanol-water. The product was 2,6-dichloro-α,α,α-trifluoro-m-toluanilide; m.p. 157°–160° C.

EXAMPLE 7

N²,N²-dimethyl-2,6-dichloro-α,α,α-trifluoro-m-toluic acid hydrazide

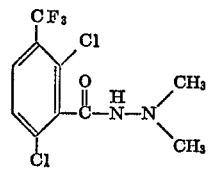

A solution of 11.1 g. (0.04 mole) of the acid chloride of Example 3 in 100 ml. of toluene was added to 6.0 g. (0.10 mole) of N,N-dimethyl hydrazine in 150 ml. of toluene. The mixture was stirred at 25° C. for 15 hours. The reactants were concentrated *in vacuo* and the residue crystallized from 1:1 methanol-water. The product was N²,N²-dimethyl-2,6-dichloro-α,α,α-trifluoro-m-toluic acid hydrazide; m.p. 158°–161° C.

EXAMPLE 8

N-(3-dimethylaminopropyl)-2,6-dichloro-α,α,α-trifluoro-m-toluamide

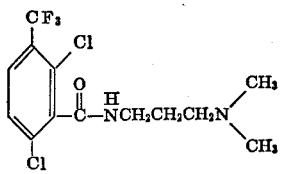

Using the procedure of the preceding example, 10.2 g. (0.10 mole) of N,N-dimethylaminopropylamine in 150 ml. of toluene was titrated with 11.1 g. (0.10 mole) of the acid chloride of Example 3 in 100 ml. of toluene. The mixture was stirred for 15 hours at 25° C.; and after concentrating by vacuum, the residue was crystallized from 1:1 methanol-water. The product was N-(3-dimethylaminopropyl)-2,6-dichloro - α,α,α - trifluoro-m-toluamide; m.p. 119°–122° C.

EXAMPLE 9

4-(2,6-dichloro-α,α,α-trifluoro-m-toluoyl) morpholine

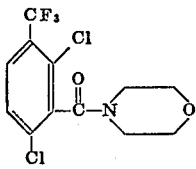

A mixture of 10.44 g. (0.12 mole) of morpholine, 5.52 g. (0.04 mole) of potassium carbonate, and 150 ml. of toluene was titrated with 11.1 g. (0.04 mole) of the acid chloride of Example 3 in 100 ml. toluene and stirred at 25° C. for 20 hours. The reactants, after concentrating *in vacuo* were recrystallized from 1:1 methanol-water. The product obtained was 4-(2,6-dichloro-α,α,α-trifluoro-m-toluoyl) morpholine; m.p. 106°–109° C.

EXAMPLE 10

N²-phenyl-2,6-dichloro-α,α,α-trifluoro-m-toluic acid hydrazide

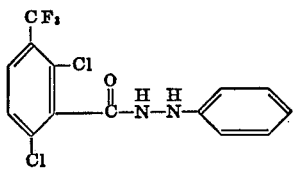

Using the procedure of the preceding example, 8.33 g. (0.03 mole) of the acid chloride of Example 3 was added to 9.72 g. (0.09 mole) of phenylhydrazine in 100 ml. of toluene and stirred for 17 hours at 25° C. The reactants were concentrated *in vacuo* and recrystallized from 1:1 methanol-water. The product was N²-phenyl-2,6-dichloro-α,α,α-trifluoro-m-toluic acid hydrazide, m.p. 183°–186° C.

EXAMPLE 11

N-benzyl-N-propargyl-2,6-dichloro-α,α,α-trifluoro-m-toluamide

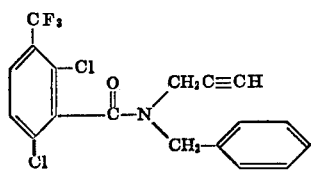

8.33 g. (0.03 mole) of the acid chloride of Example 3 was added to 100 ml. of toluene containing 13.1 g. (0.09 mole) of N-propargylbenzylamine. The reactants were mixed for 17 hours at 20° C. After concentrating under vacuum, the product was purified by recrystallizing from 1:1 methanol-water. The product was N-benzyl-N-propargyl-2,6-dichloro-α,α,α-trifluoro-m - toluamide; m.p. 122°–125° C.

EXAMPLE 12

N-Cyclohexyl-2,6-dichloro-α,α,α-trifluoro-m-toluamide

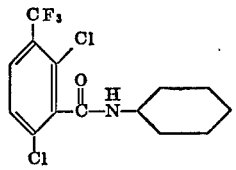

Using the procedure of the preceding example, 8.33 g. (0.03 mole) of the acid chloride of Example 3 were added to 8.9 g. (0.09 mole) of cyclohexylamine in 100 ml. of toluene. The reactants were stirred at room temperature for about 18 hours and then concentrated on rotary vacuum. The crude product was recrystallized from 1:1 methanol water yielding N-cyclohexyl-2,6-dichloro-α,α,α-trifluoro-m-toluamide; m.p. 206°–209° C.

EXAMPLE 13

N-(2,6-Dichloro-α,α,α-trifluoro-m-toluoyl)-3-azabicyclo-[2.2.1]nonane

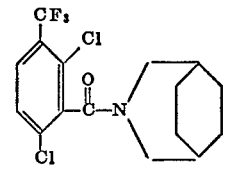

8.33 g. (0.03 mole) of the acid chloride of Example 3 were added to 11.25 g. (0.09 mole) of 3-azabicyclo[2.2.1]nonane in 150 ml. of toluene. The reactants were stirred for 18 hours at 25° C. and then concentrated under vacuum. The residue was recrystallized using 1:1 methanol-water. The product obtained was N-(2,6-dichloro-α,α,α-trifluoro-m-toluoyl)-3-azabicyclo[2.2.1]nonane; m.p. 187°–188° C.

When the process of this example is carried out and methylamine, allylamine, o-toluidine, piperazine, N-methylpiperazine, N-phenylpiperazine, piperazine-1-carboxylic acid ethyl ester, thiomorpholine, hydroxylamine or urea is substituted for 3-azabicyclo[2.2.1]nonane,
N-methyl-2,6-dichlo-α,α,α-trifluoro-m-toluamide,
N-allyl-2,6-dichloro-α,α,α-trifluoro-m-toluamide,
2,6-dichloro-2'-methyl-α,α,α-trifluoro-m-toluanilide,
N-(2,6-dichloro-α,α,α-trifluoro-m-toluoyl)piperazine,
4-(2,6-dichloro-α,α,α-trifluoro-m-toluoyl)-1-methyl-piperazine,
4-(2,6-dichloro-α,α,α-trifluoro-m-toluoyl)-1-phenyl-piperazine,
(4-[2,6-dichloro-α,α,α-trifluoro-m-toluoyl]piperazine)-1-carboxylic acid ethyl ester,
4-(2,6-dichloro-α,α,α-trifluoro-m-toluoyl)-thiomorpholine,
2,6-dichloro-α,α,α-trifluoro-m-toluhydroxamic acid or
(2,6-dichloro-α,α,α-trifluoro-m-toluoyl)-urea is obtained.

What is claimed is:
1. The compound which is N²,N²-dimethyl-2,6-dichloro-α,α,α-trifluoro-m-toluic acid hydrazide.
2. The compound which is N-(3-dimethylaminopropyl) - 2,6 - dichloro-α,α,α-trifluoro-m-toluamide.
3. The compound which is 4-(2,6-dichloro-α,α,α-trifluoro-m-toluoyl)morpholine.
4. The compound which is N²-phenyl-2,6-dichloro-α,α,α-trifluoro-m-toluic acid hydrazide.

5. The compound which is N-benzyl-N-propargyl-2,6-dichloro-α,α,α-trifluoro-m-toluamide.

6. The compound which is N-cyclohexyl-2,6-dichloro-α,α,α-trifluoro-m-toluamide.

7. The compound which is N-(2,6-dichloro-α,α,α-trifluoro-m-toluoyl) 3-azabicyclo[2.2.1]nonane.

References Cited
UNITED STATES PATENTS

| | | | |
|---|---|---|---|
| 3,357,876 | 12/1967 | Baker et al. | 260—558 |
| 3,436,208 | 4/1969 | Lemin | 260—558 |
| 3,531,277 | 9/1970 | Lemin | 260—558 |
| 3,530,181 | 9/1970 | Soloway et al. | 260—558 |
| 3,253,900 | 5/1966 | Newcomer et al. | 260—558 |

HARRY I. MOATZ, Primary Examiner

U.S. Cl. X.R.

260—243 B, 247.7 H, 268 C, 500.5, 553 E, 558 H, 558 D; 424—244, 246, 248, 250, 315, 322, 324